United States Patent
Kato

(10) Patent No.: US 6,910,724 B2
(45) Date of Patent: Jun. 28, 2005

(54) FOOTREST PLATE

(75) Inventor: Hiroyuki Kato, Utsunomiya (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/789,878

(22) Filed: Feb. 27, 2004

(65) Prior Publication Data

US 2004/0169410 A1 Sep. 2, 2004

Related U.S. Application Data

(63) Continuation of application No. PCT/US02/30735, filed on Sep. 27, 2002.

(30) Foreign Application Priority Data

Sep. 27, 2001 (JP) ........................................ 2001-296075

(51) Int. Cl.⁷ ................................................. B60N 3/06
(52) U.S. Cl. ..................................... 296/75; 297/423.1
(58) Field of Search ........................ 296/75; 297/423.1, 297/423.18, 423.39; 180/90.6; 248/351

(56) References Cited

U.S. PATENT DOCUMENTS

| | | | | |
|---|---|---|---|---|
| 3,047,088 A | * | 7/1962 | Murrell | |
| 6,220,643 B1 | | 4/2001 | Kato | 296/75 |
| 6,283,529 B2 | * | 9/2001 | Kitagawa | 296/75 |
| 6,478,359 B2 | * | 11/2002 | Dendo et al. | 296/75 |
| 6,634,694 B2 | * | 10/2003 | Matsushita | 296/75 |

FOREIGN PATENT DOCUMENTS

| | | |
|---|---|---|
| EP | 0 590 993 A1 | 4/1994 |
| EP | 1 211 130 A1 | 6/2002 |
| FR | 2 772 441 | 6/1999 |
| GB | 2 344 569 A | 6/2000 |
| JP | 62-39007 | 3/1987 |
| JP | 1-162847 | 11/1989 |
| JP | 11321425 A | 11/1999 |

* cited by examiner

Primary Examiner—Stephen Gordon
(74) Attorney, Agent, or Firm—Harness, Day & Pierce, P.L.C.

(57) ABSTRACT

A footrest plate 1 comprises a pair of first and second clips to be insertably received into a pair of corresponding first and second mounting holes 18 and 23 formed in a workpiece with leaving a certain distance therebetween. Each of the first and second clips has a rectangular cross-sectional insertion portion insertable into corresponding one of first and second mounting holes each formed in a rectangular shape. The rectangular cross-sectional insertion portion of the first clip 10 includes a pair of longitudinal sides 31 each of which extends in the longitudinal direction of the footrest plate and has a length shorter than that of each longitudinal side 25 of the first mounting hole 23 by a first clearance 26, and a pair of lateral sides 32 each of which extends in the lateral direction perpendicularly to the longitudinal direction of the footrest plate and has a length substantially equal to or slightly shorter than that of each lateral side 29 of the first mounting hole. The rectangular cross-sectional insertion portion of the second clip 9 includes a pair of longitudinal sides 33 each of which extends in the longitudinal direction and has a length substantially equal to or slightly shorter than that of each longitudinal side 25 of the second mounting hole 18, and a pair of lateral sides 34 each of which extends in the lateral direction and has a length shorter than that of each lateral side 29 of the second mounting hole 18 by a second clearance 30.

3 Claims, 4 Drawing Sheets

FOOTREST PLATE

CROSS REFERENCE TO OTHER APPLICATIONS

The present application is a continuation of pending international patent application PCT/US02/30735, filed Sep. 27, 2002, which designates the United States and was published in English, which claims priority of Japanese patent application No. 2001-296075, filed on Sep. 27, 2001.

FIELD OF THE INVENTION

The present invention relates to an elongated footrest plate having a footrest side and a rear side opposite to the footrest side, wherein the rear side is provided with clips to be fixedly received in corresponding mounting holes formed in a workpiece such as a vehicle body.

BACKGROUND OF THE INVENTION

In a recent assembly line of vehicles or the like, an elongated rectangular-shaped plastic footrest plate is attached to a workpiece such as a vehicle body as often as required. Generally, in order to facilitate the attaching operation of the footrest plate, a pair of mounting holes are formed in the workpiece, and a pair of anchor clips are provides on the rear side (opposite to the footrest side) of the footrest plate in alignment with the pair of mounting holes. Then, the pair of clips are inserted into the corresponding mounting holes to fix the footrest plate to the workpiece. The pair of mounting holes are formed at predetermined positions of the workpiece with leaving a predetermined distance therebetween. Correspondingly, the pair of clips are provided at predetermined positions of the rear side of the footrest plate with leaving a predetermined distance therebetween.

The respective positions and the distance for the pair of mounting holes should match with those for the pair of clips to allow the clips to be inserted into the corresponding mounting holes. However, complicated processes are required to form the mounting holes and the clips with a high degree of positioning accuracy, which leads to undesirably increased cost. From this point of view, each of the mounting holes is formed with a predetermined positional tolerance, and one of the clips is formed with a predetermined clearance for compensating a misalignment caused by the tolerance. In this case, if the attached footrest plate is applied with a certain load from a driver's foot rested thereon, the region of the footrest plate around the reference clip having no clearances can be secured, whereas the remaining region around the other clip is displaced by the clearance. This allows the footrest plate to be rotated several or more degrees around the reference clip, and such a rotational movement is repeatedly caused as a consequence of changes of the direction of the load, resulting in undesirable wobbling movement of the footrest.

Japanese Utility Model Laid-Open No: 62-39007 discloses an assembly for attaching a molding such as a side guard molding to a vehicle body. In this assembly, a plurality of clips are fixed to the molding, and a corresponding number of grommets are fixed to a vehicle body. Then, the clips are inserted into the corresponding grommets to attach the molding to the vehicle body. For allowing the clips to be received into the corresponding grommets even if the distance between the adjacent clips or grommets is varied by dimensional tolerances or thermal expansions, one of the adjacent grommets is arranged to have a longitudinal length greater than that of the other grommet. The assembly described in this publication does not include any suggestion on attachment of a footrest plate. Further, a misalignment caused by tolerances or thermal expansions is compensated by only one grommet. Thus, even if this assembly can be applied to a footrest, the aforementioned rotational or wobbling movement would be caused. Japanese Utility Model Laid-Open No. 01-162847 discloses an assembly for attaching a garnish to a vehicle body. In this assembly, a plurality of clips are fixed to the rear side of the garnish by means of retainers with leaving a predetermined distance therebetween. A plurality of mounting holes are formed in the vehicle body at corresponding positions apart from a predetermined distance therebetween. The retainers are formed with elongated grooves, respectively, extending in one direction to removably hold the clips in the grooves. One of the retainers is formed with an L-shaped groove so that the clip is held immovably in the retainer in the longitudinal direction. As with the aforementioned assembly, the assembly described in this publication does not include any suggestion on attachment of a footrest plate. In particular, this assembly is intended to detachably hold the garnish, and is unsuited for a measure for reducing the rotational or wobbling movement of a footrest plate.

It is therefore an object of the present invention to provide a footrest plate capable of reducing rotational or wobbling movement of the footrest plate attached to a vehicle body or the like.

SUMMARY OF THE INVENTION

In order to achieve the above object, the present invention provides a footrest plate having a footrest side and a rear side opposite to the footrest side, wherein the rear side is provided with clips to be fixedly received in corresponding mounting holes formed, in a workpiece such as a vehicle body. The clips are composed of first and second clips to be insertably received into a pair of corresponding first and second mounting holes formed in the workpiece with leaving a certain distance therebetween. Each of the first and second clips having a rectangular cross-sectional insertion portion insertable into corresponding one of the first and second mounting holes, each formed in a rectangular shape. The rectangular cross-sectional insertion portion of the first clip includes a pair of longitudinal sides each of which extends in the longitudinal direction of the footrest plate and has a length shorter than that of each longitudinal side of the first mounting hole by a first clearance, and a pair of lateral sides each of which extends in the lateral direction perpendicularly to the longitudinal direction of the footrest plate and has a length substantially equal to or slightly shorter than that of each lateral side of the first mounting hole. Further, the rectangular cross-sectional insertion portion of the second clip includes a pair of longitudinal sides each of which extends in the longitudinal direction and has a length substantially equal to or slightly shorter than that of each longitudinal side of the second mounting hole, and a pair of lateral sides each of which extends in the lateral direction and has a length shorter than that of each lateral side of the second mounting hole by a second clearance.

According to the present invention, the first clip has the clearance in the longitudinal direction to compensate a misalignment caused by a tolerance in the longitudinal direction but has no clearance in the lateral direction to act as a reference position in the lateral direction, and the second clip has the clearance in the lateral direction to compensate a misalignment caused by a tolerance in the lateral direction but has no clearance in the longitudinal direction to act as a reference position in the longitudinal direction. Thus, in the present invention, the respective clearances for compensating the misalignments caused by the tolerances are assigned to the respective first and second clips, and thereby the rotational or wobbling movement of the attached footrest plate can be reduced. In fact, the level of the rotational movement could be reduced by approximately one third.

In the above footrest plate, the first and second clips may be provided on the rear side of the footrest plate with leaving a first distance therebetween in the longitudinal direction and with leaving a second distance therebetween in the lateral direction, in alignment with the corresponding first and second mounting holes of the workpiece. Further, the first clearance may be arranged to compensate a misalignment of the first clip relative to the first mounting hole caused by a tolerance of the first distance, and the second clearance may be arranged to compensate a misalignment of the second clip relative to the second mounting hole caused by a tolerance of the second distance.

BRIEF DESCRIPTION OF THE DRAWINGS

FIGS. 5A and 5B are views showing an example of a conventional footrest plate, wherein FIG. 5A shows the relationship between clips of the footrest plate and mounting holes of a workpiece, and FIG. 5B shows a wobbling movement caused after the footrest plate is attached to the workpiece.

FIGS. 6A and 6B are views showing a footrest plate according to an embodiment of the present invention, wherein FIG. 6A shows the relationship between clips of the footrest plate and mounting holes of a workpiece, and FIG. 6B shows the state after the footrest plate is attached to the base plate without wobbling movement.

DETAILED DESCRIPTION OF THE PREFERRED EMBODIMENT

Figure 1:
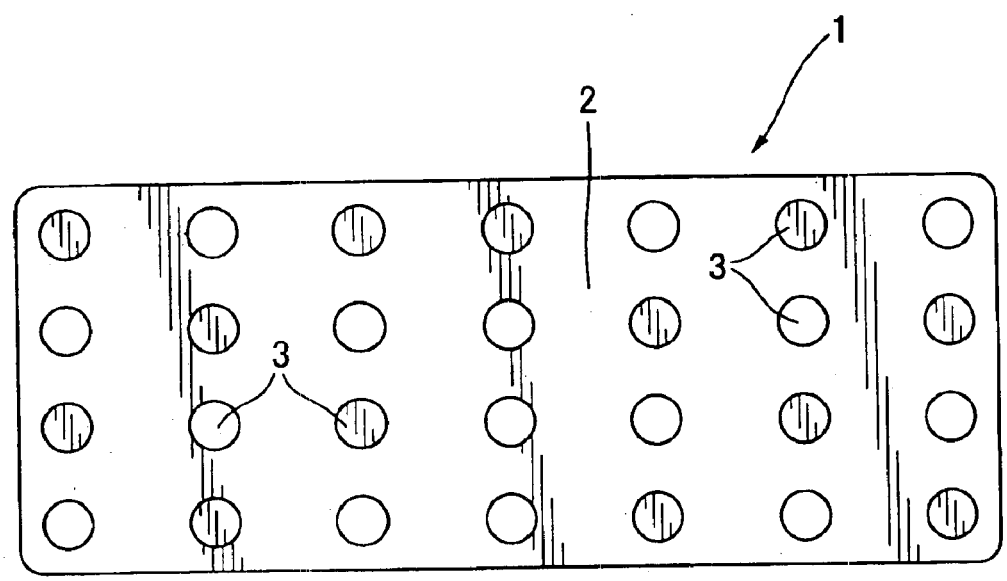
FIG. 1 is a top view of a footrest plate usable for the present invention.
Figure 2:
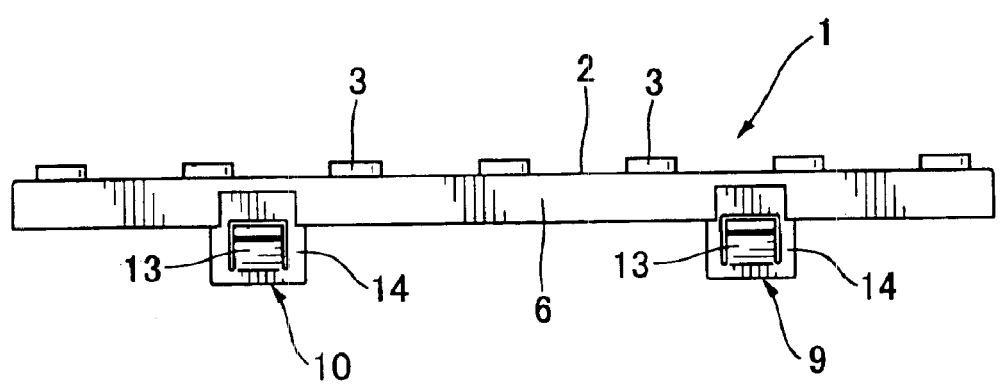
FIG. 2 is a front view of the footrest plate of FIG. 1.

With reference to the drawings, an embodiment of the present invention will now be described below. FIGS. 1 to 4 show a footrest plate 1 usable for the present invention. The footrest plate 1 is made of an elongated rectangular-shaped plastic plate member. The footrest plate has a front surface serving as a footrest side 2 on which a number of protrusions 3 are formed at predetermined positions and intervals. The rear side 5 of the footrest plate opposite to the footrest side 2 is formed in a ribbed structure for weight reduction. Specifically, a peripheral rib 6 is formed to surround the outer periphery of the footrest plate, and a center rib 7 is formed along the longitudinal axis of the footrest plate 1 to maintain the strength of the footrest plate. A pair of clips 9 and 10 to be fixedly received in corresponding mounting holes formed in a workpiece such as a vehicle body or a seat member fixed to the vehicle body are protrudingly provided or mounted on the rear side 5 opposite to the footrest side 2. As illustrated, for allowing the pair of clips 9 and 10 to be inserted into a pair of corresponding mounting holes formed in the workpiece with leaving a certain distance therebetween, the clips 9 and 10 are disposed at appropriately balanced positions of the rear side 5 of the footrest plate 1 in conformity with the distance between and the positions of the pair of mounting holes. The pair of clips 9 and 10 are integrally formed with the footrest plate 1. Each of the clips 9 and 10 is disposed between and supported by a pair of support ribs 11 which extend laterally across the center rib 7 extending longitudinally. Each of the clips is a conventional anchor clip having a pair of engagement pawls 13 on the sides thereof. In order to form these engagement pawls 13, the peripheral rib 6 has notches at the positions thereof corresponding to the clips 9 and 10.

Figure 3:
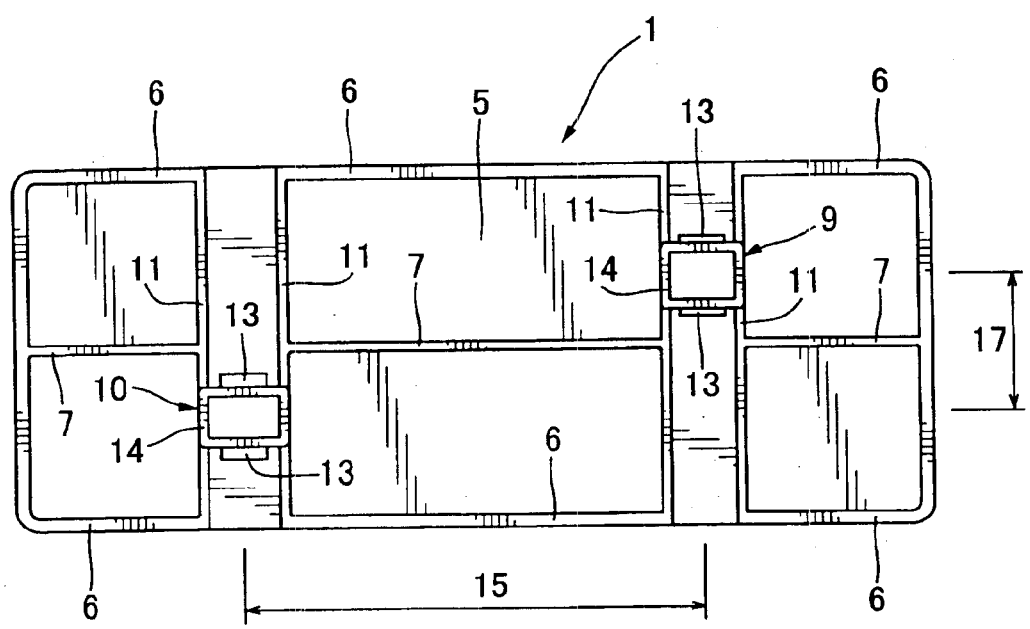
FIG. 3 is a bottom view of the footrest plate of FIG. 1.
Figure 4:
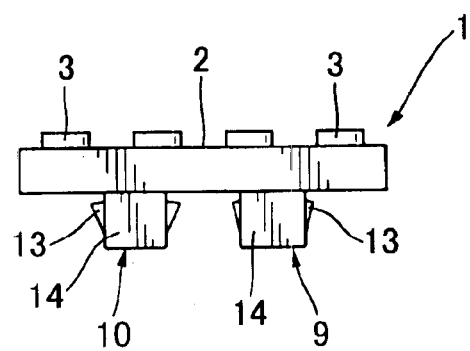
FIG. 4 is a left side view of the footrest plate of FIG. 2.

Each of the clips includes a shank 14 having a rectangular cross-sectional insertion portion insertable into corresponding one of the mounting holes each formed in a rectangular shape. Each of the shanks 14 is formed in a hollow rectangular tube for weight reduction. As shown in FIG. 3, the pair of clips are disposed with leaving a first distance 15 therebetween in the longitudinal direction of the footrest plate 1 and with leaving a second distance 17 therebetween in the lateral direction perpendicular to the longitudinal direction. The pair of mounting holes of the workpiece are formed in rectangular holes each having the same size and shape. If possible, it might be desired to set the first and second distances 15 and 17 with a high degree of accuracy.

Figure 5A:
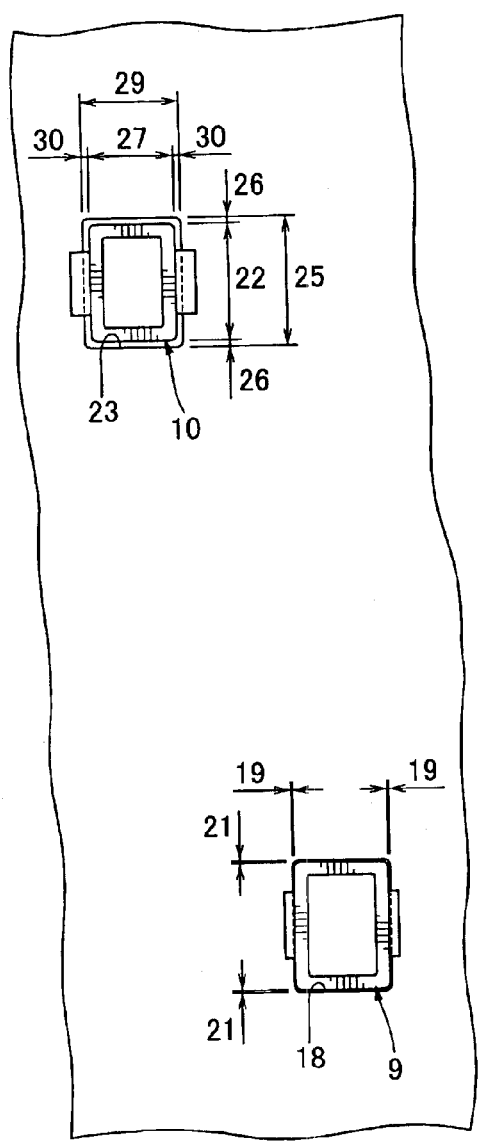

However, such highly accurate mounting holes can be hardly achieved without a highly accurate processing facility, resulting in increased manufacturing cost of vehicle body or the like. From this point of view, the pair of mounting holes are generally formed with predetermined tolerances, respectively. Further, the pair of clips are formed with a clearance to allow the misalignments caused by the tolerances to be compensated by each cross-sectional dimension of the insertion portions of the shanks. If a conventional technique for compensating a misalignment is applied to the footrest plate 1, one of the clips (for example, the clip 9) would be formed as a reference clip, and the cross-sectional dimension of the shank of the other clip (for example, the clip 10) would be formed to be smaller than the reference clip by the clearance, as shown in FIG. 5A. In FIG. 5A, the shank of the reference clip 9 is formed to be substantially equal to the designed size of the corresponding mounting hole 18 or slightly smaller than the designed size of the corresponding mounting hole 18 (by the widths 19 and 21). The shank 14 of the clip 10 includes a pair of sides, each of which extends in the longitudinal direction of the footrest plate 1 and has a length 22 shorter a length 25 of each longitudinal side of the mounting hole 23 by a first clearance 26. The shank 14 of the clip 10 also includes a pair of lateral sides each of which extends in the lateral direction perpendicularly to the longitudinal direction and has a length 27 shorter than a length 29 of each lateral side of the mounting hole 23 by a second clearance 30.

Figure 5B:
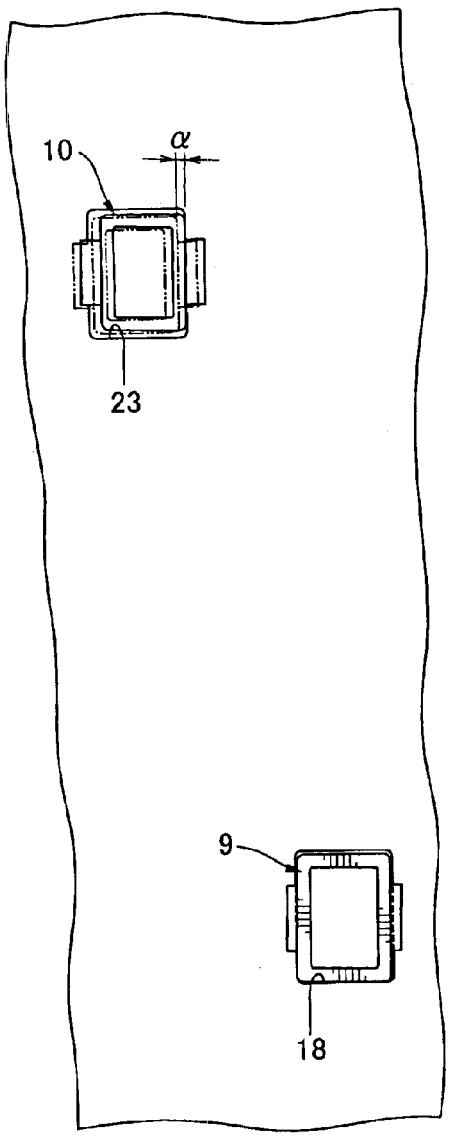

FIG. 5B shows the state after the above conventional footrest plate is attached to the base plate. The footrest plate 1 is applied with a load from a foot of a driver or the like. Such a load is often applied at an angle with respect to a perpendicular line of the footrest plate 1 to move the footrest plate 1 horizontally or vertically. The region of the footrest plate around the reference clip 9 is secured because the clip 9 is inserted into the mounting hole 18 without clearance. However, the remaining region of the footrest plate around the other clip 10 can be moved horizontally or vertically by the clearances 26 and 30. Thus, the footrest plate 1 is rotated at an angle alpha ($\alpha$) (see FIG. 5B) corresponding to the clearances of the clip 10 around the reference clip 9. This rotational movement is repeatedly caused as a consequence of changes of the direction of the load, and thereby the foot of a driver or the like is wobbled by the footrest plate 1. This is objectionable from a fundamental performance of the footrest plate.

Figure 6A:
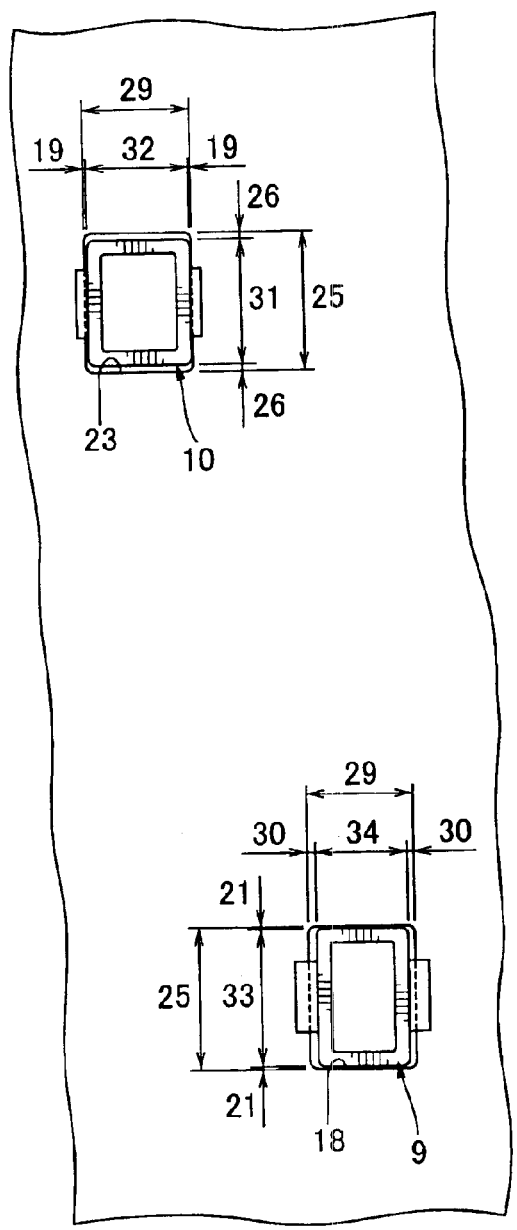

The present invention is directed to minimize or prevent the above rotational or wobbling movement of the footrest plate. As shown in FIG. 6A, in the present invention, the pair of clips formed in a rectangular shape in conformity with the corresponding mounting holes comprise a first clip (for example, the clip 10) and a second clip (for example, the clip 9). The rectangular cross-sectional shank of the first clip includes a pair of longitudinal sides each of which extends in the longitudinal direction of the footrest plate 1 and has a length 31 shorter than a length 25 of each longitudinal side of the mounting hole 23 by the first clearance 26. The shank of the first clip 10 also includes a pair of lateral sides each of which extends in the lateral direction perpendicularly to the longitudinal direction of the footrest plate and has a length 32 substantially equal to a length 29 of each lateral side of the mounting hole 23 or slightly shorter than the length 29 of each lateral side of the mounting hole 23 (only by the small width 19). Further, the rectangular cross-sectional insertion portion of the shank of the second clip 9 includes a pair of longitudinal sides each of which extends in the longitudinal direction and has a length 33 substantially equal to a length 25 of each longitudinal side of the mounting hole 18 or slightly shorter than the length 25 of each longitudinal side of the mounting hole 18 (only by the small width 21). The shank of the second clip 9 also includes a pair of lateral sides each of which extends in the lateral direction and has a length 34 shorter than a length 29 of each lateral side of the mounting hole 18 by the second clearance 30. The first clearance 26 is arranged to compensate a misalignment of the first clip 10 relative to the mounting hole 23 caused by the tolerance of the first distance 15 (see FIG. 3), and the second clearance 30 is arranged to compensate a misalignment of the second clip 9 relative to the mounting hole 18 caused by the tolerance of the second distance 17.

Figure 6B:
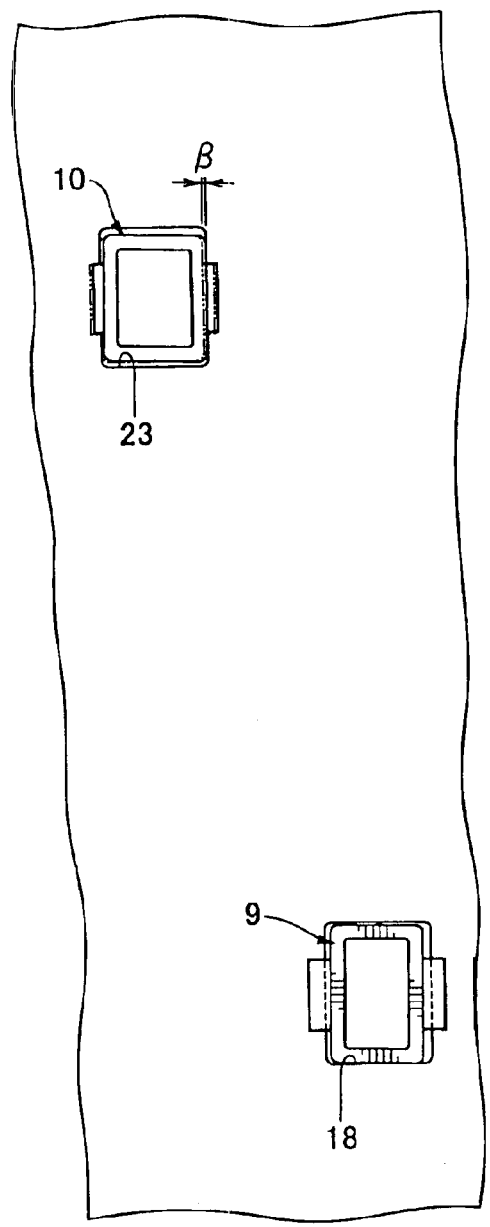

As described above, in the present invention, the first clip 10 has the first clearance in the longitudinal direction to compensate the misalignment caused by the tolerance but has almost no clearance in the lateral direction to act as a reference position in the lateral direction. Further, the second clip 9 has the second clearance in the lateral direction to compensate the misalignment caused by the tolerance but has no clearance in the longitudinal direction to act as a reference position in the longitudinal direction. Thus, in the present invention, the respective clearances 26, 30 for compensating the misalignments caused by the tolerances are apportioned between the first and second clips 10, 9. FIG. 6B shows the state after the footrest plate 1 according to the present invention is attached to the base plate. When a load from a foot of a driver or the like is applied to the footrest plate 1 at an angle, the first clip 10 acts as a reference clip having no movement in the lateral direction and the second clip 9 acts as a reference clip having no movement in the longitudinal direction, so that the respective clearances 26, 30 for compensating the misalignments caused by the tolerances are apportioned between the first and second clips 10, 9, and both the clips compensate the misalignments caused by the tolerances while acting as reference clips. Thus, the footrest plate 1 can compensate the misalignments caused by the tolerances, and practically has no rotational movement or small rotational angle beta ($\beta$) as shown in FIG. 6B. In an actual experimental result, the rotational angle beta ($\beta$) was approximately one third of the rotational angle alpha ($\alpha$) (FIG. 5B). As above, the present invention can provide reduced rotational or wobbling movement of the attached footrest plate.

According to the present invention, the first clip has the clearance in the longitudinal direction to compensate the misalignment caused by the tolerance in the longitudinal direction but has no clearance in the lateral direction to act as the reference position in the lateral direction, and the second clip has the clearance in the lateral direction to compensate the misalignment caused by the tolerance in the lateral direction but has no clearance in the longitudinal direction to act as the reference position in the longitudinal direction. Thus, the respective clearances for compensating the misalignments caused by the tolerances are apportioned between the first and second clips, and thereby the rotational or wobbling movement of the attached footrest plate can be reduced.

I claim:

1. A footrest plate having a footrest side and a rear side opposite to said footrest side, said rear side being provided with clips to be fixedly received in corresponding mounting holes formed in a workpiece wherein said clips are composed of a pair of first and second clips to be insertably received into a pair of corresponding first and second mounting holes formed in said workpiece with leaving a certain distance therebetween, each of said first and second clips having a rectangular cross-sectional insertion portion insertable into the corresponding one of said first and second mounting holes, each of which are formed in a rectangular shape;

the rectangular cross-sectional insertion portion of said first clip includes a pair of longitudinal sides each of which extends in a longitudinal direction of said footrest plate and has a length shorter than that of each longitudinal side of said first mounting hole by a first clearance, and a pair of lateral sides each of which extends in a lateral direction perpendicularly to the longitudinal direction of said footrest plate and has a length substantially equal to or slightly shorter than that of each lateral side of said first mounting hole; and the rectangular cross-sectional insertion portion of said second clip includes a pair of longitudinal sides each of which extends in said longitudinal direction and has a length substantially equal to or slightly shorter than that of each longitudinal side of said second mounting hole, and a pair of lateral sides each of which extends in said lateral direction and has a length shorter than that of each lateral side of said second mounting hole by a second clearance.

2. A footrest plate as defined in claim 1, wherein said first and second clips are provided on said rear side of said footrest plate with leaving a first distance therebetween in said longitudinal direction and with leaving a second distance therebetween in said lateral direction, in alignment with said corresponding first and second mounting holes of said workpiece.

3. A footrest plate as defined in claim 2, wherein said first clearance is arranged to compensate a misalignment of said first clip relative to said first mounting hole caused by a tolerance of said first distance, and said second clearance is arranged to compensate a misalignment of said second clip relative to said second mounting hole caused by a tolerance of said second distance.

* * * * *